(12) United States Patent  (10) Patent No.: US 8,374,708 B2
Yamada et al.  (45) Date of Patent: Feb. 12, 2013

(54) CONTROL APPARATUS FOR A SYSTEM OF MONITORING AND CONTROLLING A PLANT INCLUDING SIMULATED DATA MASS SETTING AND CANCELLING MEANS

(75) Inventors: Takahiro Yamada, Mito (JP); Yoshio Maruyama, Mito (JP); Tohru Akatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 12/755,735

(22) Filed: Apr. 7, 2010

(65) Prior Publication Data

US 2010/0262306 A1 Oct. 14, 2010

(30) Foreign Application Priority Data

Apr. 8, 2009 (JP) ................. 2009-094262

(51) Int. Cl.
G05B 11/01 (2006.01)

(52) U.S. Cl. .......................................... 700/25; 700/26

(58) Field of Classification Search .................. 700/25, 700/26
See application file for complete search history.

(56) References Cited

U.S. PATENT DOCUMENTS

2002/0077711 A1 6/2002 Nixon et al.
2008/0243283 A1* 10/2008 Nakashima et al. ............ 700/97

FOREIGN PATENT DOCUMENTS

| EP | 1 962 159 | 8/2008 |
| JP | 63-223903 | 9/1988 |
| JP | 05-282163 | 10/1993 |
| JP | 2002-244722 | 8/2002 |
| WO | WO 2004/031875 | 4/2004 |

OTHER PUBLICATIONS

English Machine Translation of JP 2002-244722.*

* cited by examiner

*Primary Examiner* — Ryan Jarrett
(74) *Attorney, Agent, or Firm* — Antonelli, Terry, Stout & Kraus, LLP.

(57) ABSTRACT

A control apparatus for a plant system has data input/output units for inputting measured data obtained from a plant and a control command for the plant, a data transmission unit for transmission of data between a control unit and a plant monitor unit which are coupled to each other through a network, and a stimulated data mass setting and cancelling unit for performing mass setting of data handled by the data input/output unit and/or data handled by the data transmission unit to simulated data managed in the form of a list table by means of a maintenance tool and performing mass cancelling of the stimulated data set in the list table.

2 Claims, 4 Drawing Sheets

CONTROL APPARATUS FOR A SYSTEM OF MONITORING AND CONTROLLING A PLANT INCLUDING SIMULATED DATA MASS SETTING AND CANCELLING MEANS

BACKGROUND OF THE INVENTION

The present invention relates to a control apparatus for a system of monitoring and controlling a plant, which control apparatus is preferably applied to, for example, a power plant to monitor its operational status.

Generally, in the power plant, a system is set up in which a plant monitor unit and a computer unit such as a maintenance tool are arranged in a central control room, these units are coupled to a control unit of boiler control system and a control unit of turbine control system through a network and control equipments associated with individual sections of the plant are operated on the basis of operation commands from the plant monitor unit or control commands from the control units.

Responsive to a request made by an operator, the plant monitor unit outputs commands for individual control equipments and displays plant information on, for example, a display unit in order to offer various kinds of control information and deliver guidance. The maintenance tool is a unit adapted to carry out maintenance operation for the control unit, having functions of preparing logics for control of the plant, loading the logics on the control unit and monitoring an operation process in the control unit.

In this type of monitoring and controlling system, in order to maintain a constant output with the aim of preventing the control equipment from operating responsive to control commands from the control unit during inspection of the control equipment and in order for the result of simulation of control theory for a control unit not to affect another control unit, the function to perform mass setting and cancelling of simulated data to and from input/output data and transmission data as well can be utilized.

Information as to what kind of simulated data is set to which input/output data and to which transmission data is managed through a list table by means of the maintenance tool, permitting the maintenance tool to execute the setting and cancelling of simulated data. Pieces of information such as simulated data to be set are managed with the help of the list table and therefore, a risk of missing the cancelling can be eliminated.

An example of this type of monitoring system is described in JP-A-2002-244722.

SUMMARY OF THE INVENTION

In carrying out mass setting and cancelling of simulated data to and from the transmission data in this type of system, the number of total items of data is large, thus giving rise to two problems as below.

A first problem resides in that because of restriction imposed on the memory capacity of the control unit, blocks of a transmission isolation data management memory for managing information necessary for mass setting and cancelling of simulated data concerning the transmission data cannot be prepared by the number equal to that of all pieces of transmission data.

More specifically, one of pieces of transmission isolation data for one piece of transmission data is written in one block. Structurally, on the other hand, respective memories represented by a simulated data storage memory for the transmission data, an actual data storage memory for storing actual transmission data and a transfer switch memory for performing switchover between simulated data and actual transmission data have blocks which are prepared by the number equal to that of all pieces of transmission data. For this reason, there arises a problem that data switchover between the transmission isolation data management memory and the other type of memory cannot be executed by using the same block number.

Blocks of the input/output isolation data management memory, however, can be prepared by the number equal to the number of all pieces of input/output data and can be adapted to perform reception and transfer of data by the use of the same block number in relation to the other simulated data storage memory, actual data storage memory and transfer switch memory which are associated with input/output data, thus escaping from the problem as above.

A second problem resides in that when blocks of the transmission isolation data management memory cannot be prepared by the number adapted for the number of all pieces of transmission data, unused blocks of the memory must be searched at the time that the transmission isolation data is written to the transmission isolation data management memory, with the result that the more the number of blocks in use, the time to search the unused blocks more increases to result in a problem that the search cannot be finished within the control cycle. For example, if the blocks in use range over the first block to the 10000-th block, it is not until unused conditions of the first to 10001-th blocks have been searched that transmission isolation is written to the 10001-th block.

Accordingly, it is an object of the present invention to carry out steadily with less process and time the setting and cancelling of simulated data by the use of the control apparatus in the plant system.

The present invention can be applicable to a control apparatus for a plant monitoring and controlling system having a control unit adapted to fetch a measured value indicative of the state of a plant and deliver a control command to the plant on the basis of the measured value and/or an operation command issued by an operator, a maintenance tool for performing maintenance of the control unit and a plant monitor unit adapted to deliver a command for operation of the plant to the control unit and display the state of the plant.

Structurally, the control apparatus comprises a data input/output unit for inputting a measured value obtained from a plant and a control command for the plant as well, a data transmission unit adapted to perform transmission of data between a control unit and a plant monitor unit which are coupled through a network and a simulated data mass setting and cancelling unit for performing mass setting of data handled by the data input/output unit and/or data handled by the data transmission unit to simulated data managed in the form of a list table by means of the maintenance tool and performing mass cancelling of the simulated data set in the list table.

According to the present invention, the data handled by the data input/output unit and/or the data handled by the data transmission unit can undergo mass setting to the simulated data managed in the form of a list table by means of the maintenance tool and the set simulated data can undergo mass cancelling. Accordingly, the plant maintenance using the maintenance tool can be carried out easily and speedily. Especially, the input/output data and the transmission data can undergo mass setting to simulated data and mass cancelling therefrom through the use of the list table and therefore, significantly great effects can be obtained under a condition that setting and cancelling needs to be executed many times.

Other objects, features and advantages of the invention will become apparent from the following description of the embodiments of the invention taken in conjunction with the accompanying drawings.

DESCRIPTION OF THE EMBODIMENTS

An embodiment of the present invention will now be described with reference to the accompanying drawings.

In the present embodiment, the invention is applied to a power plant. In the case of the power plant, a system is materialized in which a plant monitor unit and a maintenance tool such as a computer unit are arranged in a central control room, these units are coupled to control units such as a boiler control unit and a turbine control unit through a network and control equipments associated with individual sections of the plant are operated on the basis of operation command from the plant monitor unit or control commands from the control units.

Figure 1:
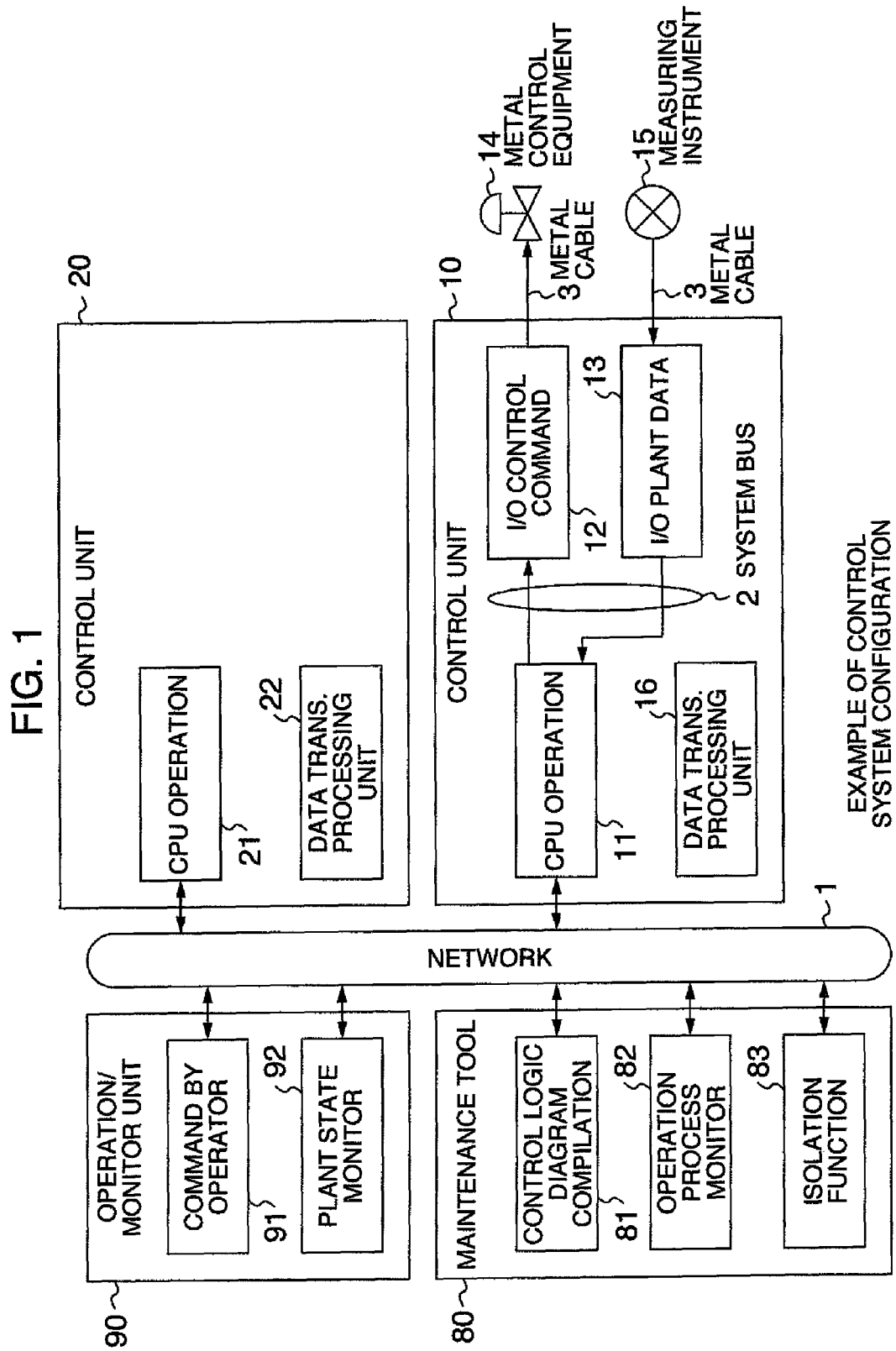
FIG. 1 is a schematic block diagram illustrating an example of an overall system configuration of a plant control system according to an embodiment of the invention.

Referring first to FIG. 1, a system of controlling a plant is constructed as illustrated therein. Control units 10, 20 are provided for, for example, individual control systems. In an example of FIG. 1, a control equipment 14 such as a valve and a measuring instrument 15 such as a temperature sensor are connected to the control unit 10 through the medium of metal cables 3, respectively. Further control units other than control units 10 and 20 may be provided depending on the configuration of control system.

In the control unit 10, a CPU (central processing unit) 11 representing an arithmetic operation control unit is provided and this CPU 11 is coupled to a control command input/output unit 12 and to a plant data input/output unit 13 through a system bus 2. The control command input/output unit 12 is connected to the control equipment 14 to control the state of control equipment 14 (for example, make-and-break). The plant data input/output unit 13 is connected to the measuring instrument 15 to capture data indicative of the state of the plant. The CPU 11 of control unit 10 transmits data to an operation monitor unit 90 and also to a maintenance tool 80 through an established network 1. Further, the CPU 11 also performs data transmission to another control unit in the system (such as control unit 20) through the network 1. For the sake of performing data transmission via the network 1, the control unit 10 has a data transmission processing unit 16, 22 and is coupled to the network 1 by way of the data transmission processing unit. The network 1 can be set up as a network of various types such as wired LAN, wireless LAN or the like.

Likewise, the control unit 20 has a CPU 21 representing an arithmetic operation unit which controls a similarly connected control equipment (not shown) and inputs measured data from a similarly connected measuring instrument (not shown). The control unit 20 also has a data transmission process unit (not shown) and is coupled to the network 1 by way of the data transmission process unit.

The operation monitor unit 90 is constructed of a computer unit, for example, and functionally, it includes an operator-operative command generator 91 and a plant state monitor 92. Then, a command generated in the operator-operative command generator 91 under operation by an operator is outputted to each of the control units 10, 20 and plant state information from each of the control units 10, 20 is supplied to the plant state monitor 92 through the network 1, so that various monitoring processes such as displaying data on a display can be executed. Through display executed as above, various kinds of information can be offered and guidance can be delivered to the operator.

The maintenance tool 80 edits logics of the individual control units 10, 20 and besides, performs operation of maintenance for the monitor in calculation process. The maintenance tool 80 is also constructed of a computer unit and an operator engaging in the maintenance work has the maintenance tool in hand to couple it to the network 1.

The maintenance tool 80 includes a control logic diagram editor 81, an operation process monitor 82 and an isolation function unit 83 and transmits data to the control unit coupled through the network 1.

In the control unit 10, a command from the operation monitor unit 90 is inputted via the network 1 and on the basis of this command and a measured value inputted from the measuring instrument 15, the CPU 11 operates a control command and delivers it to the control equipment 14.

In the maintenance tool 80, a monitor screen for monitoring, for example, a calculation process in the control unit 10 can be generated and displayed. Then, through the monitor screen, input/output data or transmission data to which simulated data are desired to be set are chosen and the thus selected simulated data can be registered in the list table. Now, on the basis of the registration list table, setting of simulated data and cancelling of the set simulated data can be executed collectively or in a mass fashion by commands from the maintenance tool 80.

Next, by making reference to FIG. 2, an example of a process state when simulated data is set to each of the control units 10, 20 by means of the maintenance tool 80 will be described.

Figure 2:
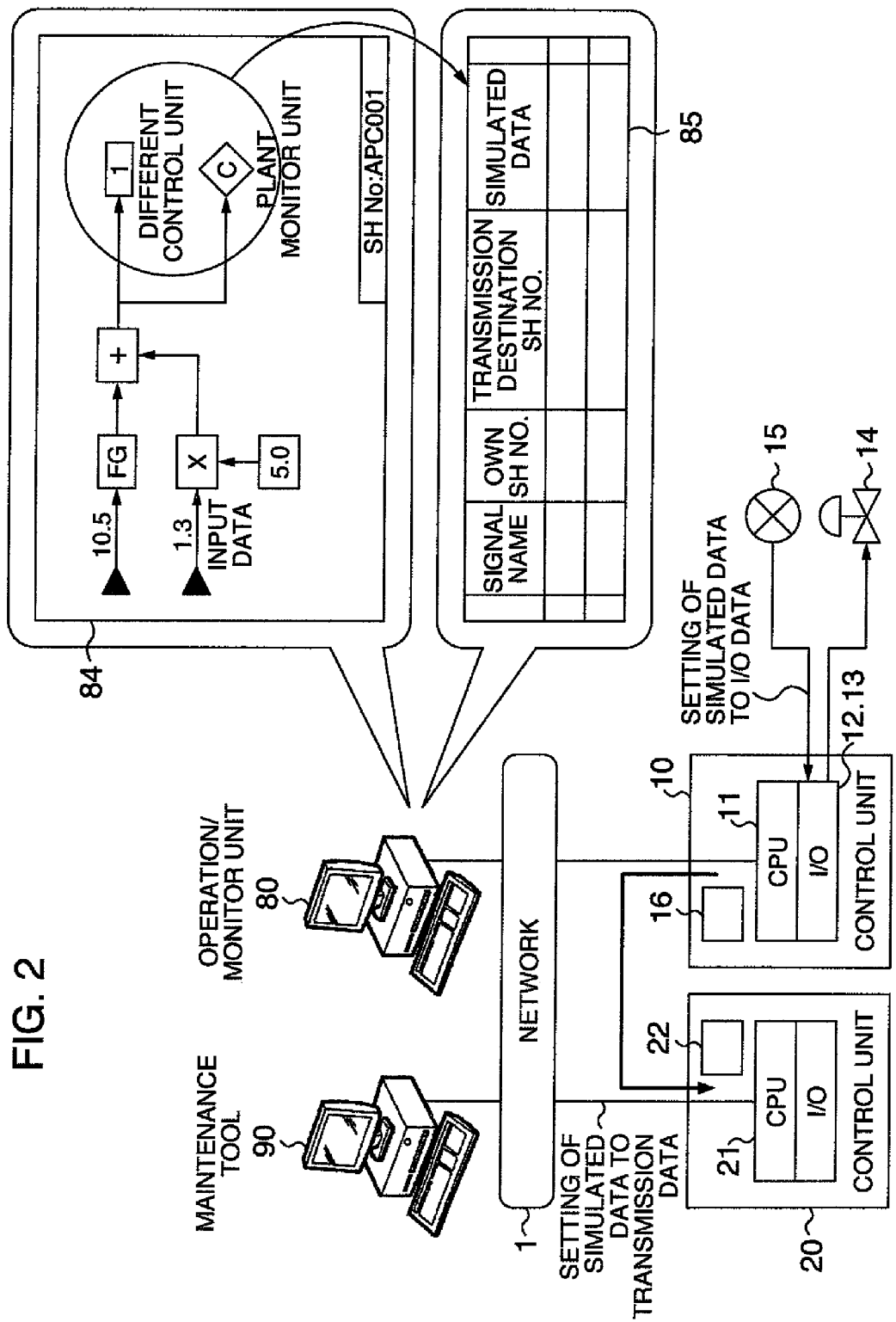
FIG. 2 is a diagram useful to explain the process state in the maintenance tool and control unit of the system in the embodiment of the invention.

As shown in FIG. 2, in the maintenance tool 80, a monitor screen 84 for monitoring the results of calculation executed by the control units 10, 20 is displayed. Displayed on the monitor screen 84 is a logic diagram illustrative of an operation process by the CPU as will be seen from FIG. 2. Input/output data and transmission data having their simulated data desired to be set are selected from the monitor screen 84 by the operator and then the simulated data are registered in the form of a list table 85 in the maintenance tool 80.

The data to be managed through the list table 85 includes, for example, a signal name, a transmission source SH (sheet) No., a transmission destination SH No. and simulated data. Since the data managed in the form of the list table 85 does not include addresses of input/output data and transmission data but includes the SH No. and Nos. assigned to these elements, the data is not affected by changes the addresses of the input/output data and transmission data undergo in the course of compile. The input/output data referred to herein is that interchanged between the control unit and the control equipment such as valve and between the measuring instrument and the control unit and for example, the control unit 10 can set simulated data in the input/output data to/from the control equipment 14 and the measuring instrument 15. Setting of the simulated data is applied to control command input/output unit 12 and plant data input/output unit 13 which represent the data input/output unit of control unit 10 and an operating state corresponding to a state in question is set in a simulated fashion.

The transmission data is that interchanged through the network 1 and the simulated data can be set in data transmitted from the control unit 10 to the different control unit 20, for example.

Figure 3:
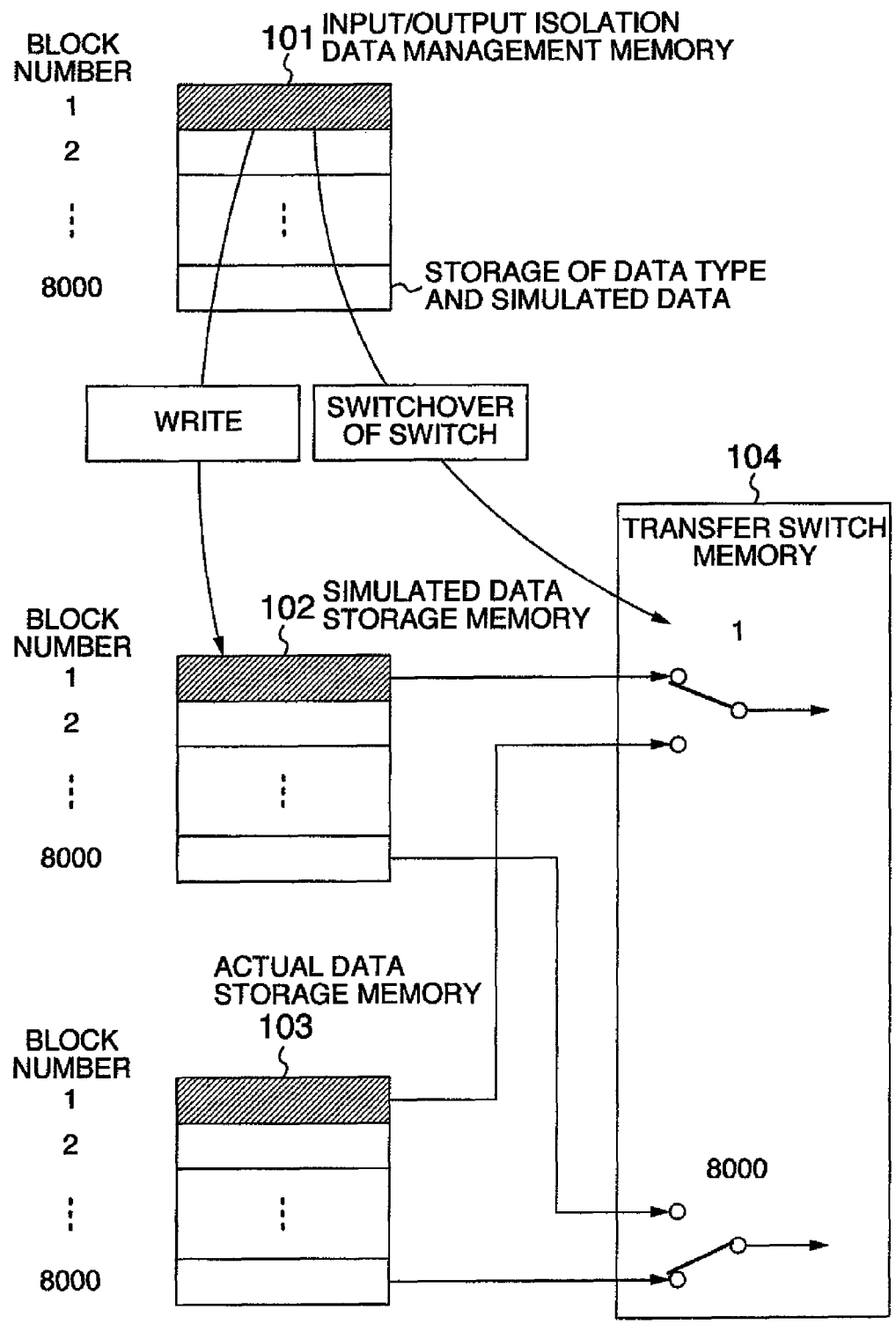
FIG. 3 is a diagram useful to explain the process state in the input/output isolation memory in the embodiment of the invention.

Next, an example of a memory structure associated with the setting and cancelling of simulated data to and from the input/output data will be described with reference to FIG. 3. Individual memories shown in FIG. 3 are storage units provided for each of the control units 10, and are coupled to the individual CPU's 11, 12 through the internal bus 2. A CPU may be provided in each of control units other than the control units 10, 20.

An input/output isolation data management memory 101 is a memory adapted to store information necessary for mass setting of data format and simulated data and for mass cancelling of the set simulated data. Blocks of the input/output isolation data management memory 101 are prepared by the number equal to that of pieces of input/output data.

A simulated data storage memory 102 is a memory for write of the simulated data stored in the input/output isolation data management memory 101, an actual data storage memory 103 is a memory for storing actual input/output data and a transfer switch memory 104 is a memory used for selection of either simulated data or actual data. Prepared for the number of blocks of each of the simulated data storage memory 102, actual data storage memory 103 and transfer switch memory 104 is the number of pieces of input/output data.

Thus, the number of blocks is the same for all of the memories 101, 102, 103 and 104 and so, inter-reference to values among the memories, for example, can be achieved by using the same block number. For example, when the maintenance tool 80 makes a request for setting of simulated data to input/output data corresponding to a block number 1, input/output isolation data is stored at a block of block number 1 in the input/output isolation data management memory 101 and the input/output isolation data management memory 101 rewrites blocks of block number 1 of the simulated data storage memory 102 and transfer switch memory 104, thus making it possible to output the simulated data.

Figure 4:
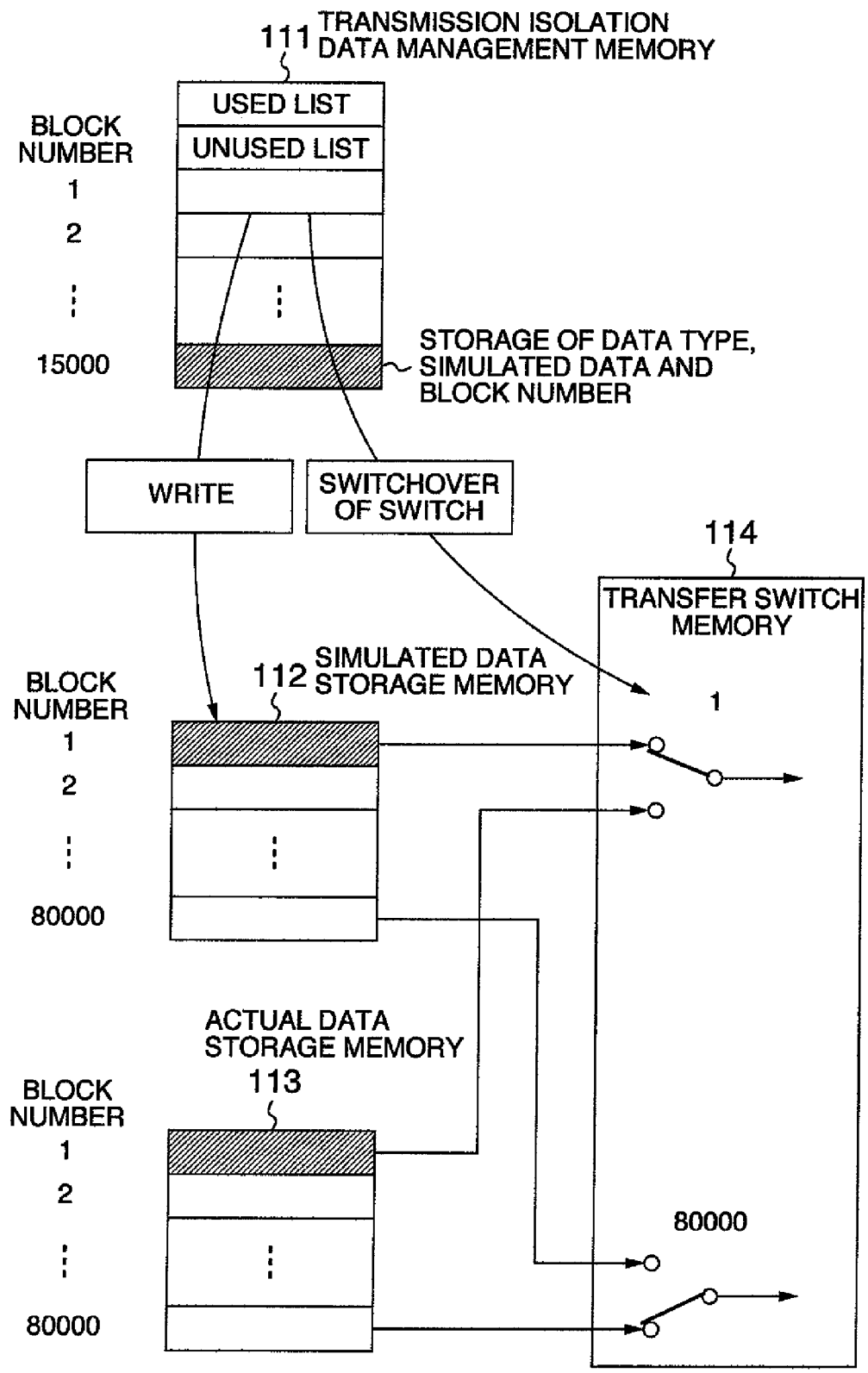
FIG. 4 is a diagram useful to explain the process state in the transmission isolation memory in the embodiment of the invention.

Next, reference is made to FIG. 4 to describe a memory structure associated with setting and cancelling of simulated data to and from transmission data. Memories for transmission data are provided for each of the control units 10, 20 separately from or independently of the aforementioned memories 101, 102, 103 and 104 dedicated to input/output data.

In the present embodiment, a memory structure similar to that for input/output data is not provided for the control unit on account of restriction imposed on the memory capacity. More particularly, a simulated data storage memory 112, an actual data storage memory 113 and a transfer switch memory 114 which are adapted for transmission data have the same structure as the corresponding memories 102, 103 and 104 which are adapted for input/output data, having the number of blocks equal to the number of pieces of transmission data prepared.

Contrarily, a transmission isolation data management memory 111 has a structure in which the number of blocks does not equal to that of pieces of transmission data so as to reduce the memory capacity.

Without preparing the number of blocks equal to that of pieces of transmission data, the number of blocks of the transmission isolation data management memory 111 differs from that of each of the other memories 112, 113 and 114 and if this condition stands intact, pieces of data cannot mutually be referred to through mutual reference of block numbers.

Accordingly, in the present embodiment, a block number corresponding to that of each of the three memories 112, 113 and 114 is stored in the transmission isolation data management memory 111. By making reference to the stored block number, simulated data of transmission data can be set in a mass fashion in the control unit. Thus, when consulting or making reference to the different memory, the transmission isolation data management memory 111 can carry out searching easily and steadily by using the block number as key.

In writing the transmission isolation data into the transmission isolation data management memory 111, an unused block of the memory needs to be searched and if this stands intact, there is the possibility that search of the block number cannot be finished within the prescribed control cycle when the number of used blocks is large. Searching unused blocks is necessary because the number of blocks of the transmission isolation data management memory 111 does not coincide with the number of total pieces of transmission data and only information concerning transmission data for which simulated data setting is requested must be inserted sequentially in unused blocks.

Then, in the present embodiment, the list structure is adopted for the transmission isolation data management memory 111 so as to prepare a used list and an unused list, enabling used blocks and unused blocks to be managed. Through this, the time to search can be shortened and the search can be finished within the prescribed control cycle.

More specifically, when taking the case where the maintenance tool 80 requests setting of simulated data to a piece of transmission data, for instance, an unused block number is searched on the basis of the unused list of transmission isolation data management memory 111 and the transmission isolation data is stored. In this phase, the transmission isolation data management memory 111 is stored with a block number of each of the three memories 112, 113 and 114 which corresponds to the transmission data for which the request for setting of simulated data is made. The transmission isolation data management memory 111 rewrites by using the stored block number as key values stored at blocks corresponding to block numbers in the simulated data storage memory 112 and transfer switch memory 114, so that simulated data can be outputted in place of actual data.

Since the simulated data can be delivered in this manner, change to the simulated data can be achieved through processes which are less in number and less time consuming. Also, when the simulated data is returned to actual data, a similar process can be conducted to complete the change through processes which are less time consuming and less in number.

While the FIG. 4 example has been described by way of transfer of actual data to simulated data, a similar process may proceed when simulated data is switched over to return to actual data.

In the foregoing, the process applied to the simulated data of transmission data has been described exemplarily but a similar process may be conducted when, for example, the input/output data is switched over to the simulated data and the switched simulated data is returned to the actual data as shown in FIG. 3.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A plant monitoring and controlling system comprising:
a control unit for fetching a measured value indicative of the state of a plant and outputting a control command to the plant, on the basis of the measured value and/or an operation command by an operator;
a maintenance tool for performing maintenance of said control unit; and
a plant monitor unit for delivering to said control unit the operation command for said plant and displaying the state of said plant;
an isolation data management data memory managing isolation data representing information necessary for mass setting or mass cancelling of the simulated data;
a simulated data storage memory storing simulated data;
an actual data storage memory storing data handled by said data input/output means or said data transmission means; and
a transfer switch memory performing switchover between the simulated data and the actual data are provided,
said control unit comprising:
data input/output means for inputting a measured value obtained from said plant and inputting a control command for said plant,
data transmission means for performing transmission of data between said control unit and said plant monitor unit which are coupled together through a network, and
simulated data mass setting and cancelling means for performing mass setting of data handled by said data input/output means and/or data handled by said data transmission means to simulated data managed in the form of a list table by means of said maintenance tool and performing mass cancelling of the simulated data set in said list table,
wherein said simulated data mass setting and cancelling means performs setting or cancelling on the basis of a simulated data mass setting command or a simulated data mass cancelling command transmitted from said maintenance tool, wherein contents of said isolation data management data memory, said simulated data storage memory, said actual data storage memory, and said transfer switch memory for input/output data handled by said data input/output means are provided separately from those for transmission data handled by said data transmission means, and
wherein said isolation data management memory for transmission data stores block numbers of said simulated data storage memory, actual data storage memory and transfer switch memory.

2. A plant monitoring and controlling system comprising:
a control unit for fetching a measured value indicative of the state of a plant and outputting a control command to the plant, on the basis of the measured value and/or an operation command by an operator;
a maintenance tool for performing maintenance of said control unit; and
a plant monitor unit for delivering to said control unit the operation command for said plant and displaying the state of said plant;
an isolation data management data memory managing isolation data representing information necessary for mass setting or mass cancelling of the simulated data;
a simulated data storage memory storing simulated data;
an actual data storage memory storing data handled by said data input/output means or said data transmission means; and
a transfer switch memory performing switchover between the simulated data and the actual data are provided,
said control unit comprising:
data input/output means for inputting a measured value obtained from said plant and inputting a control command for said plant,
data transmission means for performing transmission of data between said control unit and said plant monitor unit which are coupled together through a network, and
a simulated data mass setting and cancelling means for performing mass setting of data handled by said data input/output means and/or data handled by said data transmission means to simulated data managed in the form of a list table by means of said maintenance tool and performing mass cancelling of the simulated data set in said list table,
wherein said simulated data mass setting and cancelling means performs setting or cancelling on the basis of a simulated data mass setting command or a simulated data mass cancelling command transmitted from said maintenance tool,
wherein contents of said isolation data management data memory, said simulated data storage memory, said actual data storage memory, and said transfer switch memory for input/output data handled by said data input/output means are provided separately from those for transmission data handled by said data transmission means, and
wherein said isolation data management memory for transmission data stores block numbers of said simulated data storage memory, actual data storage memory and transfer switch memory, and
wherein said isolation data management memory adopts a list structure in which a used list and an unused list are prepared.

* * * * *